United States Patent [19]
Javitt et al.

[11] Patent Number: 5,237,591
[45] Date of Patent: Aug. 17, 1993

[54] CIRCUIT FOR DIGITALLY ADDING LOSS TO A SIGNAL

[75] Inventors: Kimerie W. Javitt, Hillside, N.J.; Kannan Ramchandran, Belle Harbor, N.Y.

[73] Assignee: AT&T Bell Laboratories, Murray Hill, N.J.

[21] Appl. No.: 747,038

[22] Filed: Aug. 19, 1991

[51] Int. Cl.$^5$ ............................................. H04B 14/04
[52] U.S. Cl. ............................................ 375/25; 375/7
[58] Field of Search ......................... 375/25, 30, 7–8; 341/75, 76, 77

[56] References Cited

U.S. PATENT DOCUMENTS

| 4,595,907 | 6/1986 | Huffman et al. | 341/75 |
| 4,884,285 | 11/1989 | Heynen et al. | 375/25 |
| 5,008,672 | 4/1991 | Leedy | 341/138 |

Primary Examiner—Curtis Kuntz
Assistant Examiner—Young Tse
Attorney, Agent, or Firm—Lester H. Birnbaum

[57] ABSTRACT

Disclosed is a circuit for adding loss to a signal in a loop carrier transmission system. As data is being transmitted, the circuit determines the digital output needed for an appropriate amount of loss for each channel unit at the end user interface.

11 Claims, 5 Drawing Sheets

CIRCUIT FOR DIGITALLY ADDING LOSS TO A SIGNAL

BACKGROUND OF THE INVENTION

This invention relates to digital loop carrier transmission systems and, in particular, to a means for adding loss to the digital signals.

In a typical digital transmission system, such as the Subscriber Loop Carrier (SLC®) system, digital signals are transmitted between a central office and a Remote Terminal (RT) which is connected to the end user. In proposed fiber-to-the-home systems, an optical link is provided between the remote terminal and a distant terminal which serves a number of end users. The remote terminals and distant terminals each include channel units which provide an interface with the end user.

In typical SLC® systems, transmission loss between the tip/ring interface at the central office and the tip/ring interface at the remote terminal is approximately 1 dB for Plain Old Telephone Service (POTS) channel units. Additional transmission loss is normally added by the long metallic drop between the remote terminal and the end user. In a fiber-to-the-home system, most of the metallic drop is replaced by a lossless fiber. Therefore, grade of service may be optimized by adding an amount of loss to the transmitted signal which is dependent on the type of channel unit employed at the remote or distant terminal. This loss can be added to either the digital or analog side of the channel units. Adding loss on the digital side is generally preferred since it can be fully integratable and one loss circuit can be shared by several channel units.

Traditionally, digital loss is added by using a look-up table. In such systems, a Read Only Memory (ROM) contains Pulse Code Modulation (PCM) output words corresponding to the PCM input words for a particular loss value to be added. A problem with this approach is that when more than one loss value is desired, the amount of memory required becomes excessive. Also, a hardware change is required to add new loss values.

SUMMARY OF THE INVENTION

The invention is a circuit which includes means for receiving a pulse code modulated digital word having a segment and step portion, and means for calculating a multiplicand based on the input segment and step portions. Means are also provided for generating a desired loss coefficient and serially multiplying the resulting multiplicand by the desired loss coefficient. Further provided are means for calculating an addition factor and means for adding the factor to the result of the serial multiplication in order to calculate an output pulse code modulated digital word. Means are further provided for transmitting the output word.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION

Figure 1:
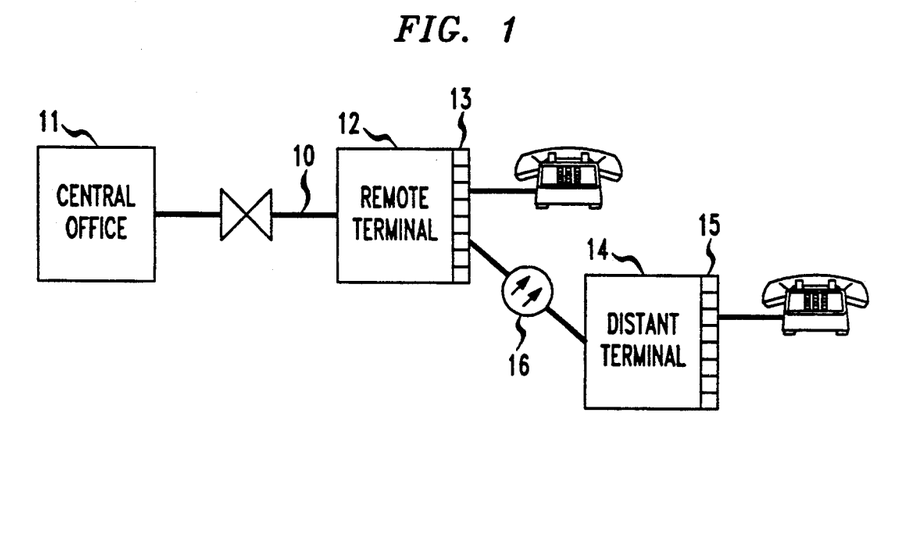
FIG. 1 is a block diagram of a basic digital loop carrier transmission system.

FIG. 1 illustrates a typical digital loop carrier transmission system which can incorporate the present invention. Digital transmission takes place over a bidirectional link, 10, which could be optical or electrical, the link being between a telephone central office, 11, and a remote terminal 12. End users can be linked directly to the remote terminal through a plurality of channel units 13. In a typical fiber-to-the-home system, an optical link, 16, is established between the remote terminal 12 and a distant terminal, 14. End users are linked to the distant terminal, again, through a plurality of channel units 15.

Figure 2:
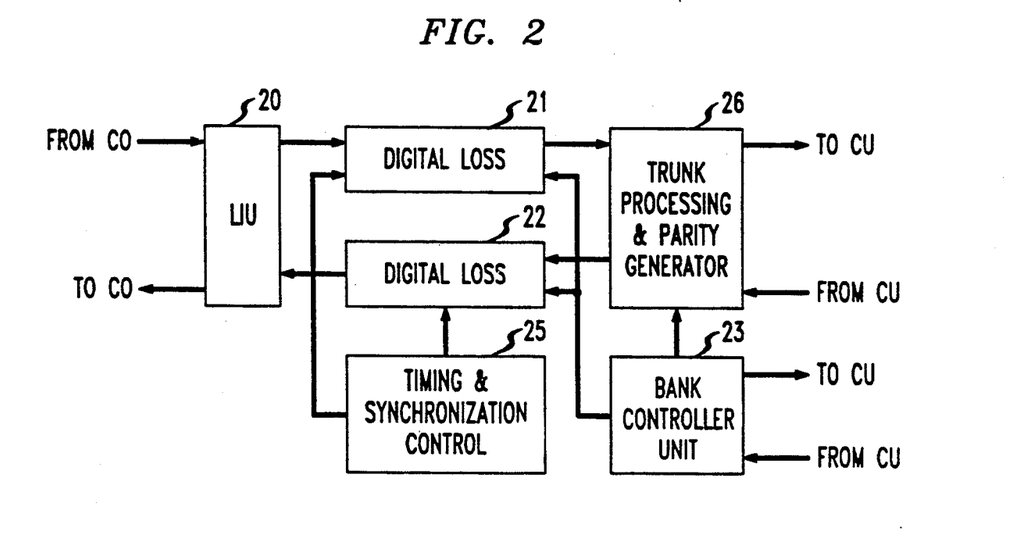
FIG. 2 is a block diagram of a portion of a remote terminal including a digital loss circuit in accordance with an embodiment of the invention.

FIG. 2 illustrates in some more detail a portion of a remote terminal which includes a digital loss circuit. Transmission to and from the central office is provided through a Line Interface Unit (LIU), 20. Digital loss is provided by a pair of digital loss circuits, 21 and 22, one for each direction of transmission. The amount of loss, α, provided by the digital loss circuits is determined by the Bank Controller Unit (BCU) 23. Clock pulses for the loss circuit, as described in more detail later, are provided by a Timing and Synchronization Control Circuit, 25, which is normally a part of any remote terminal. The interface between the Channel Units (CU) and remote terminal is provided by a standard circuit, 26, which, among other functions performs trunk processing, parity generation, and parity checking.

Figure 3:
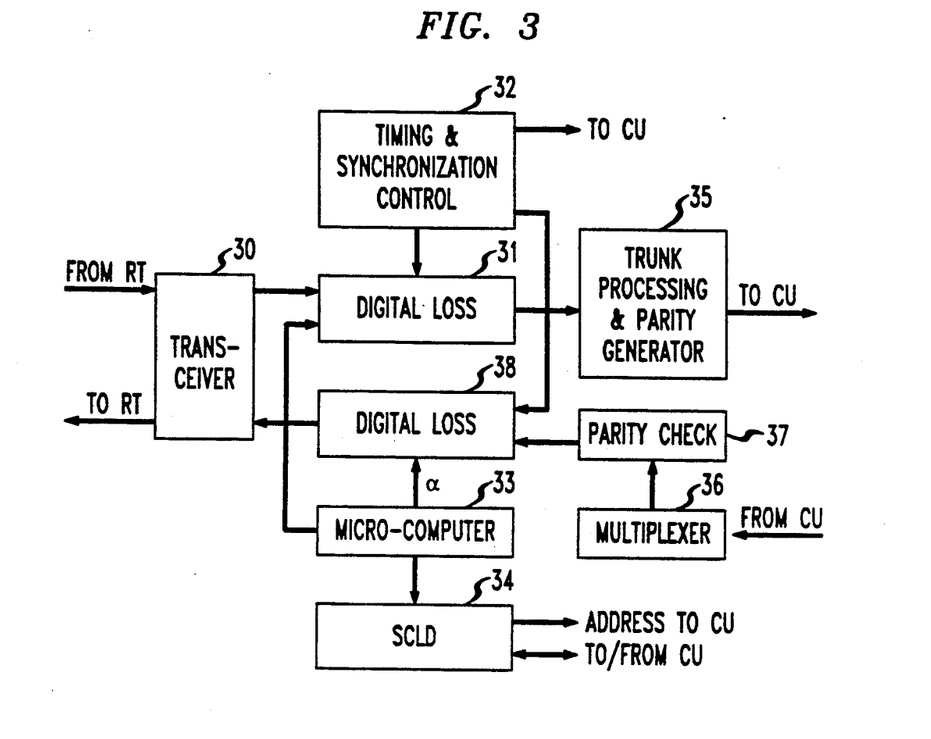
FIG. 3 is a block diagram of a portion of a distant terminal including a digital loss circuit in accordance with a further embodiment of the invention.

FIG. 3 illustrates a further embodiment of the invention, which is a distant terminal including means for adding digital loss. Incoming signals from a remote terminal are coupled to a transceiver 30. This portion of the distant terminal basically converts from optical to electrical signals and changes the data (DS1) format to be compatible with the channel units. The incoming signal is then coupled to a digital loss circuit 31. Clock signals for the loss circuit are, again, supplied by a Timing and Synchronization Control Circuit 32. The amount of loss, α, is determined by a microcomputer, 33, which communicates with the channel units through a Serial Control Link Device (SCLD), 34. Once appropriate loss is added, the signal is, again, coupled to a trunk processing and parity generator portion, 35, and then on to the channel unit.

In the reverse direction, signals from the channel units are multiplexed by multiplexer, 36, and coupled to a parity checker, 37. Loss is added by loss circuit, 38, which, like circuit 31, receives clock signals from Timing and Synchronization Control 32 and loss coefficients, α, from microcomputer 33. The signal is then sent through transceiver, 30, and on to the RT.

Figure 4:
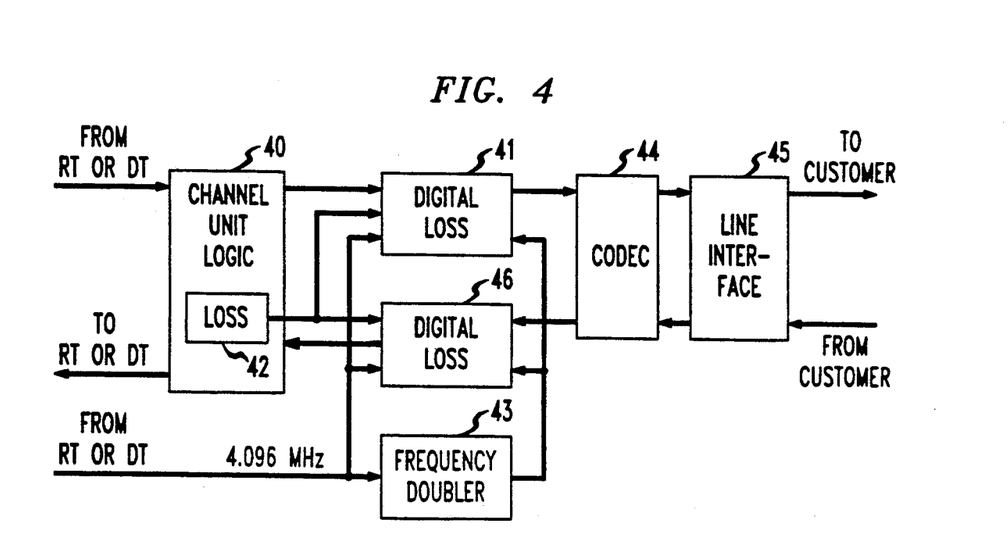
FIG. 4 is a block diagram of a portion of a channel unit including a digital loss circuit in accordance with a further embodiment of the invention.

In accordance with the embodiment of FIG. 4, digital loss can be added at the channel unit itself. A signal from an RT or DT is coupled to a channel unit logic circuit, 40, which, among other functions, selects the right time slot for the channel unit. Digital loss is then added by loss circuit 41. In this example, the loss coefficient can be provided by a register, 42, within the channel unit logic circuit, which register can be set by the Bank Controller Unit at the RT or DT. A 4.096 MHz clock signal is provided to the loss circuit from a standard control unit such as 25 of FIG. 2 or 32 of FIG. 3, and an 8.192 MHz clock signal is provided by frequency doubler 43. The digital signal with loss is then coupled to a Codec, 44, for conversion to an analog signal and then coupled through a standard line interface circuit, 45, to the customer. In the reverse direction, once the analog signal is converted to a digital signal by Codec 44, loss is provided by digital loss circuit, 46. As in the case of circuit, 41, the loss coefficient is provided by register 42, and clock pulses are provided by a control unit and by frequency doubler 43.

Figure 5:
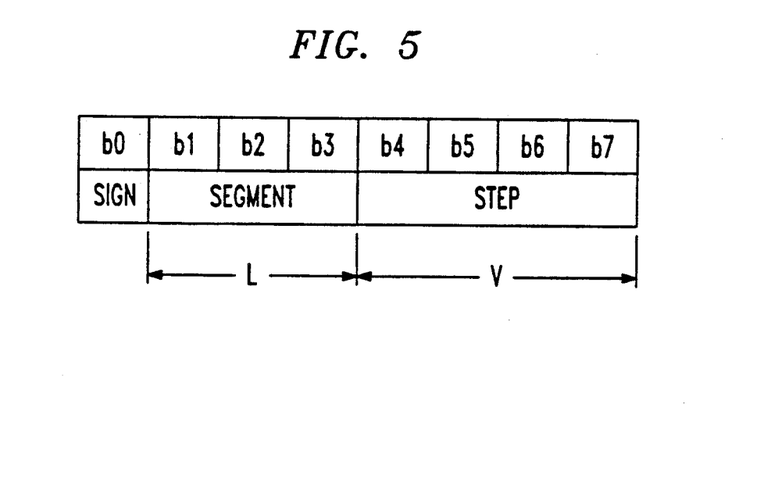
FIG. 5 is an illustration of a PCM word format.

FIG. 5 illustrates the typical form for a PCM digital word. Bit positions are designated b0–b7. The first bit indicates the sign of the word. Bits b1–b3 indicate the segment number, while bits b4–b7 indicate the step number of the word. The segment number is represented by "L" and the step number by "V" in the subsequent calculations.

Figure 6:
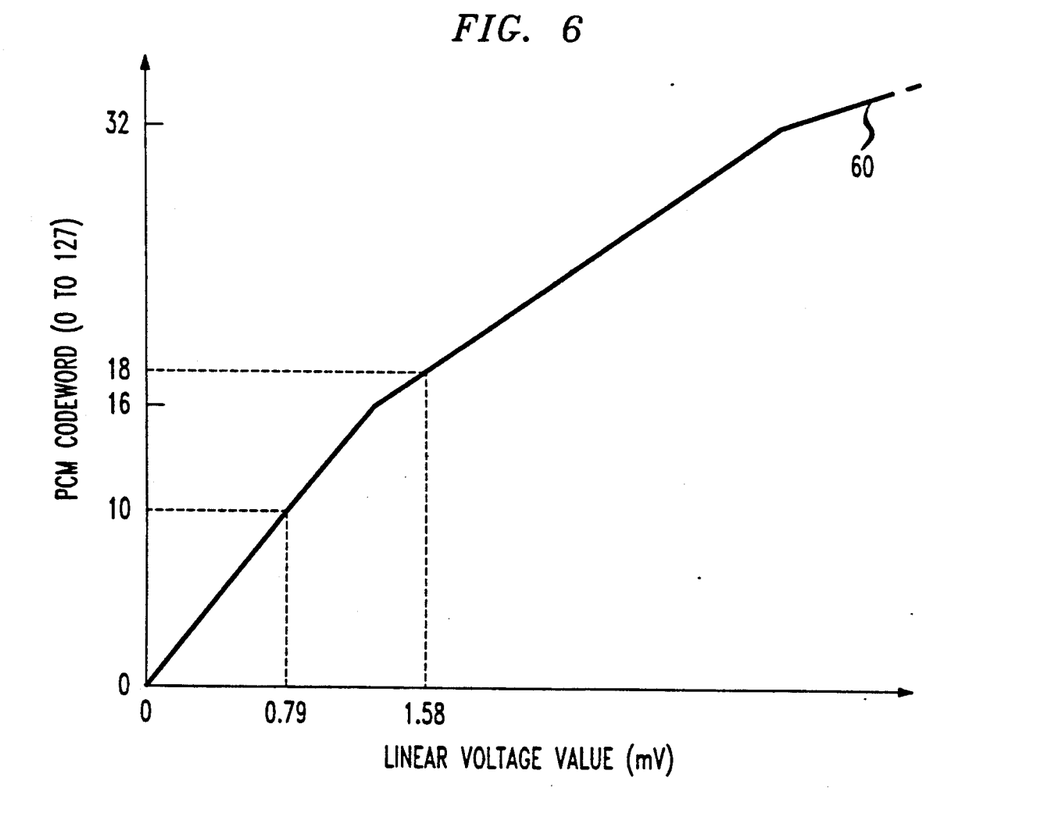
FIG. 6 is a graph showing the relationship between the PCM code word and the analog signal level.

The concept of segment and step numbers is illustrated in the graph of FIG. 6. In order to convert from an analog voltage on the X-axis to a PCM word on the Y-axis, a curve, 60, is drawn with various linear segments. Only three of the segments are shown for the sake of illustration. Typically, fifteen segments are used, with seven in the positive (X, Y) quadrant and seven in the negative (−X, −Y) quadrant and the fifteenth overlapping the positive and negative quadrants centered around the origin (not shown). The positive or negative quadrant is determined by the sign bit. Each segment is divided into 16 pieces, or steps, so that each PCM word has a segment and step number on the graph 60. Thus, for example, a voltage signal of 1.58 mVolts corresponds to a PCM word of segment (L)=001 and step (V)=0010, which also corresponds to the digital value 18. If it is desired to add 6 dB ($\alpha=0.5$) loss to this signal, the voltage would drop to 0.79 mV and the new PCM word would be segment (L)=000 and step (V)=1010, which has the digital value of 10. It should be appreciated that, for purposes of the calculations, all bits have been inverted from the conventional manner of representing PCM words. That is, in the graph of FIG. 6, the zero mV value is usually represented by all "1s", while the maximum analog value is represented by all "0s".

Based on the graph of FIG. 6, the analog voltage (X) corresponding to a particular PCM word can be calculated from the equation:

$$X = 2^L \cdot (V + 16.5) - 16.5 \quad (1)$$

where, again, L is the segment number and V is the step number. If a loss, $\alpha$, is to be added, the new value of X (Xnew) is:

$$X_{new} = \alpha X_{old} \quad (2)$$

where $X_{old}$ is the analog voltage prior to the addition of the loss. Thus, from equation (1)

$$2^{L_{new}} \cdot (V_{new} + 16.5) - 16.5 = \alpha \cdot [2^{L_{old}} \cdot (V_{old} + 16.5) - 16.5] \quad (3)$$

where the subscripts "old" represent the signal without loss added, or the input signal, and the subscripts "new" designate the signal with a loss, $\alpha$, added, or the output signal.

In order to simplify the solution of equation (3), it is assumed that $\alpha$ is more than ½ and is less than or equal to 1 (½ < $\alpha$ ≦ 1). With that assumption, it can be shown that the new segment will be the same as the old segment ($L_{new} = L_{old}$) or the new segment will be one less than the old segment ($L_{new} = L_{old} - 1$). In the former case, the new step will be equal to B−16, and in the latter case, the new step will be equal to 2·B−16, where $$B = \alpha \cdot [V_{old} + 16.5 - (16.5 \cdot 2^{-L_{old}})] + 2^{-L_{old}} \cdot 16.5 \quad (4)$$

In the discussion which follows, the expression $[V_{old} + 16.5 - (16.5 \cdot 2^{-L_{old}})]$ will be termed the multiplicand, M, and the term $2^{-L_{old}} \cdot 16.5$ will be designated the addition factor, Z.

Figure 7:
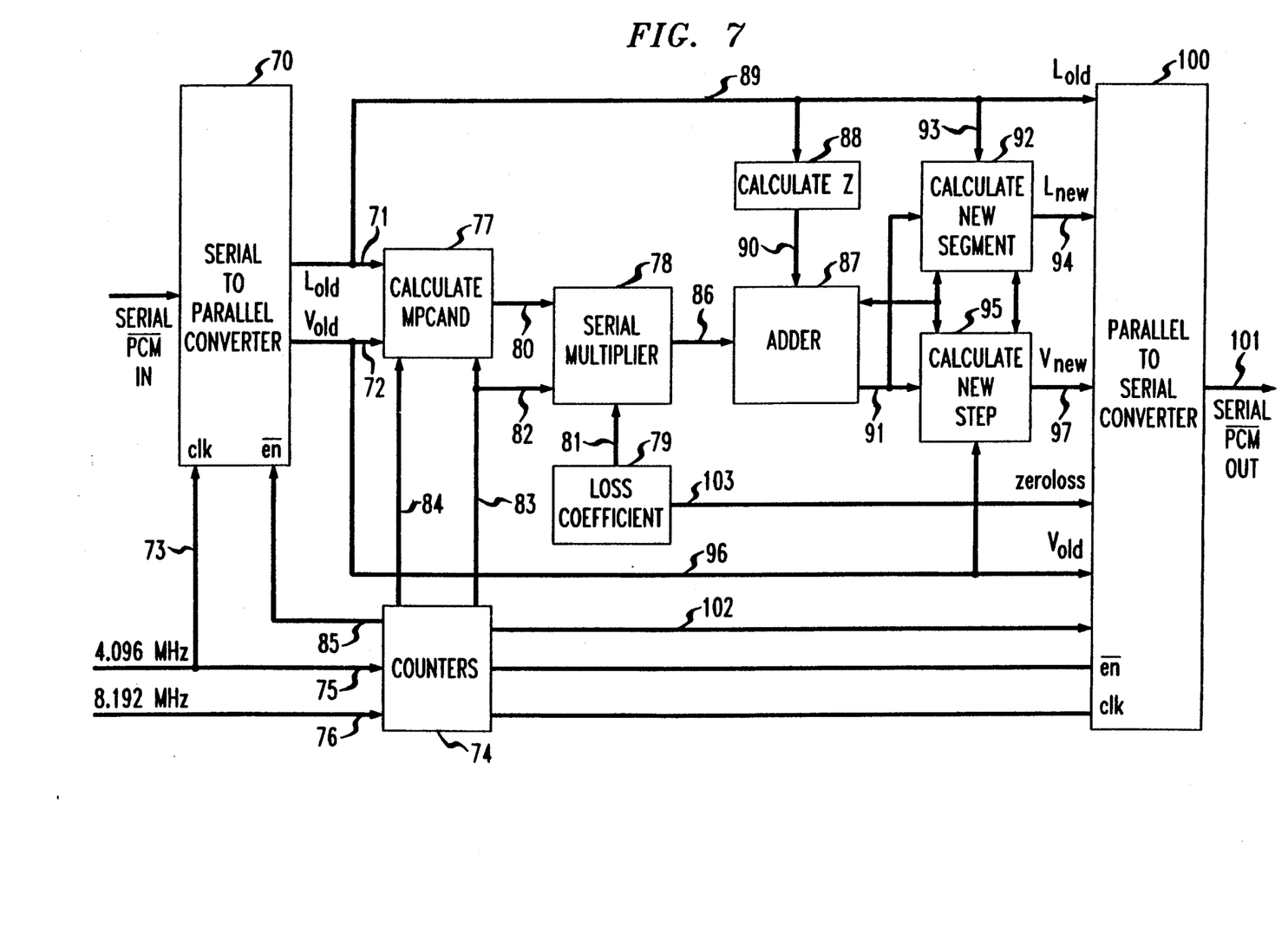
FIG. 7 is a block diagram of a digital loss circuit in accordance with an embodiment of the invention.

FIG. 7 illustrates the portion of the circuit in accordance with the invention which will add the appropriate amount of loss to the digital stream. The input stream is received by a serial-to-parallel converter, 70, which inverts every bit and divides each PCM word into a segment number comprising 3 bits on line 71 and a step number comprising 4 bits on line 72. The data is shifted in converter 70 in synchronization with a 4.096 MHz clock signal supplied from another portion of the circuit pack (at the remote terminal, distant terminal or channel unit) on line 73. The same clock signal is also supplied to the counter 74 on line 75. An 8.192 MHz clock signal is also applied to counter 74 on line 76.

Figure 8:
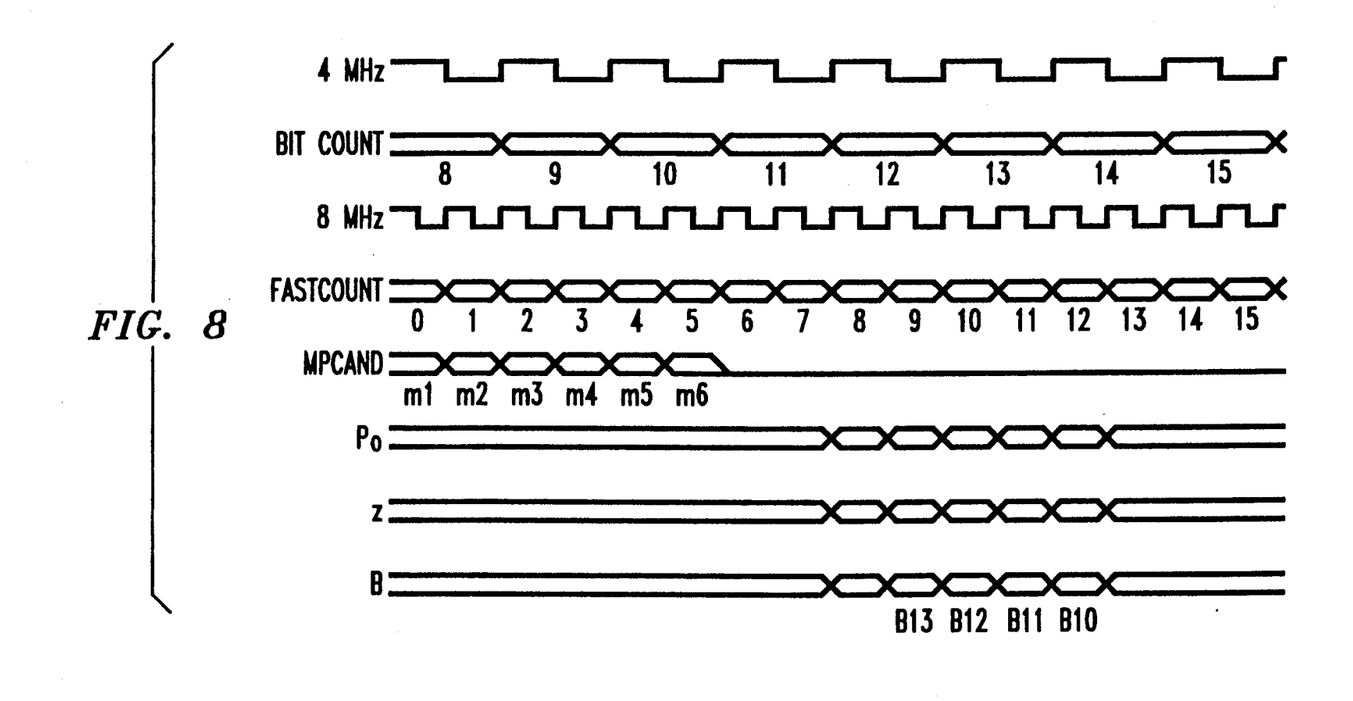
FIG. 8 is a timing diagram for the circuit of FIG. 7.

With further reference to the timing diagram of FIG. 8, it will be appreciated that the data in the serial-to-parallel converter 70 becomes available at the output when the bit count reaches "8", the data having been introduced into the converter during counts 0–7 (not shown). Since each subscriber slot includes 8 bits of PCM code followed by 8 bits of control data, the calculation of digital loss is conveniently performed during the latter 8 bits of the time slot, i.e., counts 8–15.

The data on lines 71 and 72 is coupled to the portion of the circuit, 77, which calculates the multiplicand. The counter 74 also provides the 8.192 MHz clock signal to the portion 77 on line 83, and a fast count from this 8.192 MHz clock signal is also applied to the portion 77 on line 84. The portion, 77, can be implemented by a standard logic gate circuit.

This portion of the circuit calculates the multiplicand based on the segment and step number ($L_{old}$, $V_{old}$) appearing at the input 71, 72. This calculation, and, therefore, the circuitry, is simplified by noting the possible values of the multiplicand for each possible segment number, $L_{old} = 0 \rightarrow 7$, and representing the step number ($V_{old}$) by a four digit binary number $V_{10}V_{11}V_{12}V_{13}$. It can then be shown that the multiplicand will have a value in accordance with the table below,

| | Value of MPCAND for different segment values mpcand, of the form ($m_6m_5m_4m_3m_2m_1$) | | | | | |
|---|---|---|---|---|---|---|
| $L_{old}$ | msb | | | | | lsb |
| 0 | 0 | $V_{10}$ | $V_{11}$ | $V_{12}$ | $V_{13}$ | 0 |
| 1 | $V_{10}$ | $nV_{10}$ | $V_{11}$ | $V_{12}$ | $V_{13}$ | 1 |
| 2 | $(V_{11} + V_{10})$ | $n(V_{10} \oplus V_{11})$ | $nV_{11}$ | $V_{12}$ | $V_{13}$ | 1 |
| 3 | $(V_{12} + V_{11} + V_{10})$ | $n[(V_{12} + V_{11}) \oplus V_{10}]$ | $n(V_{12} \oplus V_{11})$ | $nV_{12}$ | $V_{13}$ | 1 |
| 4 | $(V_{10} + V_{11} + V_{12} + V_{13})$ | $n[V_{10} \oplus (V_{11} + V_{12} + V_{13})]$ | $n[V_{11} \oplus (V_{12} + V_{13})]$ | $n(V_{12} \oplus V_{13})$ | $nV_{13}$ | 1 |
| 5 | 1 | $V_{10}$ | $V_{11}$ | $V_{12}$ | $V_{13}$ | 0 |
| 6 | 1 | $V_{10}$ | $V_{11}$ | $V_{12}$ | $V_{13}$ | 1 |
| 7 | 1 | $v_{10}$ | $V_{11}$ | $V_{12}$ | $V_{13}$ | 1 | where n indicates an inversion of the calculated bit, "$\oplus$" indicates an exclusive or function, "+" indicates a logical or function, msb is the most significant bit ($m_6$), and lsb is the least significant bit ($m_1$) of the multiplicand.

Again referring to FIG. 8, the resulting multiplicand will be shifted out of 77 on line 80 with the least significant bit ($m_1$) first so that the least significant bit is shifted out during the first clock cycle of the 8.192 MHz clock (fast count=0) followed by the next least significant bit at fast count=1, etc. This signal is coupled into a serial multiplier (78 of FIG. 7) along with a loss coefficient $\alpha$ from some source which is indicated simply by box 79. (It will be recalled that the loss coefficient can be provided, for example, by the Bank Controller Unit, 23, of FIG. 2, the microcomputer, 33, of FIG. 3, or the channel unit logic register, 42, of FIG. 4.) The loss coefficient, $\alpha$, is an 8-bit binary representative of some number between 0.5→1 in the form $0 \cdot \alpha_7 \ldots \alpha_1$, which is shifted into serial multiplier 78 as a parallel input on line 81. As each bit of the multiplicand is introduced into serial multiplier 78, it is multiplied by $(\alpha_7 \ldots \alpha_1)$ and then shifted to the appropriate bit position so that eventually the appropriate factors can be added to produce the serial multiplication $P_o = \alpha \cdot$ multiplicand. A standard serial multiplier with fast carry look ahead may be utilized for this purpose.

As shown in FIG. 8, the least significant bit of $P_o$ will appear at the output of the serial multiplier at fast count=8 and the remaining bits appear at the next five clock cycles (fast count=9–13). Returning to FIG. 7, the result ($P_o$) appears on line 86 and is introduced into adder 87.

During fast count=8–13, $Z(2^{-L_{old}} + 16.5)$ is also calculated based on $L_{old}$ from line 89 utilizing portion 88 which is a look-up table. The output from this portion is introduced into adder 87 on line 90. The output, 13, of the adder appears on line 91 during fast count=9–12 as digits $B_{13}, B_{12}, B_{11}, B_{10}$.

It can be shown that, if $B \geq 16$, then the new segment will equal the old segment, i.e., $L_{new} = L_{old}$, whereas if $B < 16$, the segment decreases by one, i.e., $L_{new} = L_{old} - 1$.

Therefore, portion 92 receives the old step number, $L_{old}$, on line 93, and determines if B (introduced on line 91) is greater than or less than 16. Based on that determination, $L_{new}$ appears as an output on line 94.

Similarly, if $B \geq 16$, then the new step number, $V_{new}$, will be given by $B - 16$, while if $B < 16$, the new step number will be $2B - 16$. Thus portion, 95, receives the old step number $V_{old}$ on line 96 and also compares the value of B with 15 in order to produce $V_{new}$ on line 97.

The new segment and step are determined at fast count=13. When fast count=14, the values are parallel shifted into parallel-to-serial converter 100 and a signal from counter 74 on line 102 indicates to the converter that calculations are completed. At fast count=15, the new segment and step number are fully loaded into the converter. This also corresponds to bit count 15 as illustrated in FIG. 8. Thus, the new signal value, which includes the new segment and step number, can be serially shifted out of converter 100 at bit counts 0→7 in the next time slot. It will be noted, however, that the PCM byte is inverted as it is shifted out on output 101.

In the event that a zero loss coefficient is generated by means 79, a signal appears on line 103 to tell the converter to load $L_{old}$ and $V_{old}$ from lines 89 and 96 into the converter 100, thus bypassing portions 77, 78, 87, 88, 92 and 95.

The circuit depicted in FIG. 7 can be used to provide loss in both the receive and transmit directions (e.g., circuits 21 and 22, respectively of FIG. 2). The only difference is that in the receive direction, the data will be transitioned on the positive edge of the 4.096 MHz clock edge, while in the transmit direction, the data will be transitioned on the negative edge.

Various modifications of the invention will become apparent to those skilled in the art. All such variations which basically rely on the teachings through which the invention has advanced the are properly considered within the scope of the invention.

We claim:

1. A circuit comprising:
   means for receiving an input pulse code modulated digital word having a segment portion and step portion;
   circuit means for calculating a multiplicand based on the input word segment portion and step portion;
   circuit means for generating a desired loss coefficient;
   circuit means for serially multiplying the multiplicand by the desired loss coefficient;
   circuit means for calculating an addition factor based on the input word segment portion;
   circuit means for adding the factor to the result of the serial multiplication in order to calculate an output pulse code modulated digital word; and
   means for transmitting the output word.

2. The circuit according to claim 1 further comprising means for providing clock pulses to the circuit.

3. The circuit according to claim 2 wherein the means for providing clock pulses includes means for providing a faster clock pulse to the means for calculating the multiplicand than to the means for receiving the input word.

4. The circuit according to claim 1 wherein the multiplicand is given by:

$$V_{old} + 16.5 - (16.5 \cdot 2^{-L_{old}})$$

where $V_{old}$ is the input step number and $L_{old}$ is the input segment number.

5. The circuit according to claim 4 wherein the addition factor is given by:

$$2 - L_{old}.16.5.$$

6. The circuit according to claim 1 further comprising means for applying a loss coefficient to the serial multiplication means.

7. The circuit according to claim 6 wherein the loss coefficient is within the range ½-1.

8. The circuit according to claim 1 wherein the means for receiving the digital word comprises a serial-to-parallel converter and the means for transmitting the output word comprises a parallel-to-serial converter.

9. In a digital loop carrier transmission system, a remote terminal comprising a line interface unit for receiving and transmitting a digital stream including pulse code modulated digital words each having a segment portion and step portion between the remote terminal and a central office, a trunk processing circuit for receiving and transmitting a digital stream including pulse code modulated digital words each having a segment portion and step portion between the remote terminal and a plurality of channel units, and a circuit for adding loss to the digital stream coupled between the line interface unit and trunk processing circuit, said loss circuit comprising:
    means for receiving an input pulse code modulated word having a step portion and segment portion;
    means for calculating a multiplicand based on the input segment portion and step portion of the input word;
    means for serially multiplying the multiplicand by a desired loss coefficient;
    means for calculating an addition factor based on the input word segment portion;
    means for adding the factor to the result of the serial multiplication in order to calculate an output pulse code modulated digital word; and
    means for transmitting the output word.

10. In a digital loop carrier transmission system, a distant terminal comprising a transceiver for receiving and transmitting a digital stream including pulse code modulated digital words each having a segment portion and step portion between the distant terminal and a remote terminal, a trunk processing circuit for transmitting a digital stream including pulse code modulated digital words each having a segment portion and step portion to a channel unit, and a circuit for adding loss to the digital stream coupled between the transceiver and trunk processor, said loss circuit comprising:
    means for receiving an input pulse code modulated word having a segment portion and a step portion;
    means for calculating a multiplicand based on the input word segment portion and step portion;
    means for serially multiplying the multiplicand by a desired loss coefficient;
    means for calculating an addition factor based on the input word segment portion;
    means for adding the factor to the result of the serial multiplication in order to calculate an output pulse code modulated digital word; and
    means for transmitting the output word.

11. In a digital loop carrier transmission system, a channel unit comprising a channel unit logic circuit for transmitting and receiving a digital stream including pulse code modulated digital words between the channel unit and another portion of the system, a line interface circuit for transmitting an analog signal between the channel unit and a customer, a Codec for converting between analog and digital signals, and a circuit for adding loss to the digital stream coupled between the channel unit logic circuit and the Codec, the loss circuit comprising:
    means for receiving an input pulse code modulated word having a segment portion and step portion;
    means for calculating a multiplicand based on the input word segment and step portion;
    means for serially multiplying the multiplicand by a desired loss coefficient;
    means for calculating an addition factor based on the input word segment portion;
    means for adding the factor to the result of the serial multiplication in order to calculate an output pulse code modulated digital word; and
    means for transmitting the output word.

* * * * *

UNITED STATES PATENT AND TRADEMARK OFFICE
CERTIFICATE OF CORRECTION

PATENT NO. : 5,237,591

DATED : August 17, 1993

INVENTOR(S) : Kimerie W. Javitt and Kannan Ramchandran

It is certified that error appears in the above-identified patent and that said Letters Patent is hereby corrected as shown below:

Column 5, line 54, "$L_{new} = -$" should read --$L_{new} = $--.

Signed and Sealed this

Twentieth Day of September, 1994

Attest:

BRUCE LEHMAN

*Attesting Officer*    *Commissioner of Patents and Trademarks*